(12) United States Patent
Falco

(10) Patent No.: US 10,133,489 B2
(45) Date of Patent: Nov. 20, 2018

(54) SYSTEM AND METHOD FOR SUPPORTING A LOW CONTENTION QUEUE IN A DISTRIBUTED DATA GRID

(71) Applicant: Oracle International Corporation, Redwood Shores, CA (US)

(72) Inventor: Mark Falco, Burlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 56 days.

(21) Appl. No.: 14/856,114

(22) Filed: Sep. 16, 2015

(65) Prior Publication Data

US 2016/0077739 A1    Mar. 17, 2016

Related U.S. Application Data

(60) Provisional application No. 62/051,010, filed on Sep. 16, 2014.

(51) Int. Cl.
| | |
|---|---|
| *G06F 9/455* | (2018.01) |
| *G06F 9/46* | (2006.01) |
| *G06F 3/06* | (2006.01) |
| *G06F 9/00* | (2006.01) |
| *H04L 12/883* | (2013.01) |
| *H04L 29/08* | (2006.01) |

(52) U.S. Cl.
CPC ........... *G06F 3/061* (2013.01); *G06F 3/0655* (2013.01); *G06F 3/0688* (2013.01); *G06F 9/00* (2013.01); *H04L 49/9015* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 5,023,776 | A   * | 6/1991 | Gregor | G06F 12/0897 |
| | | | | 711/118 |
| 7,000,234 | B1 * | 2/2006 | Shavit | G06F 5/10 |
| | | | | 719/313 |
| 7,389,291 | B1 * | 6/2008 | Shavit | G06F 9/526 |
| 2004/0181504 | A1 * | 9/2004 | Chang | G06F 17/30958 |
| 2007/0157214 | A1 * | 7/2007 | Martin | G06F 7/785 |
| | | | | 719/315 |

(Continued)

*Primary Examiner* — Bradley A Teets
(74) *Attorney, Agent, or Firm* — Tucker Ellis LLP

(57) ABSTRACT

A system and method which supports a low contention queue in a multithreaded processing environment such as a distributed data grid. The queue is optimized to reduce memory contention and queue processing overhead, and is lock-free. The queue includes a doubly-linked list of nodes, wherein each node is associated with a value, a reference to a next node and a reference to a previous node. Furthermore, the queue allows one or more consumer threads to access the queue via a reference to a last removed node from the doubly linked list, and allows one or more producer threads to insert a new node via a reference to a tail node in the doubly-linked list. The low queue efficiently serves large number of threads with reduced contention, overhead, and latency, thereby improving performance in a multithreaded processing environment such as a distributed data grid.

18 Claims, 5 Drawing Sheets

(56) References Cited

U.S. PATENT DOCUMENTS

| | | | |
|---|---|---|---|
| 2011/0264687 A1* | 10/2011 | Surtani | G06F 17/30949 707/769 |
| 2012/0307838 A1* | 12/2012 | Manula | H04L 49/358 370/412 |
| 2012/0311273 A1* | 12/2012 | Marathe | G06F 9/467 711/151 |
| 2014/0089619 A1* | 3/2014 | Khanna | G06F 17/30578 711/166 |
| 2014/0109110 A1* | 4/2014 | Gleyzer | H04L 43/0811 719/314 |

* cited by examiner

SYSTEM AND METHOD FOR SUPPORTING A LOW CONTENTION QUEUE IN A DISTRIBUTED DATA GRID

CLAIM OF PRIORITY

This application claims priority to U.S. Provisional Patent Application No. 62/051,010, entitled "SYSTEM AND METHOD FOR SUPPORTING A LOW CONTENTION QUEUE IN A DISTRIBUTED DATA GRID" filed Sep. 16, 2014 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a distributed data grid.

SUMMARY

A distributed data grid may implement a multiple producer single consumer queue in situations where multiple services or threads are producing messages, tasks, or other data to a single for ordered consumption by a single service or thread. A conventional queue presents a bottleneck in such applications owing to contention between the many services/threads attempting to perform operations on the queue. It is therefore desirable to provide a low contention queue that overcomes the disadvantages of the conventional queue by, among other things, reducing contention between the multiple threads or services performing operations on the queue thereby alleviating the bottleneck and improving performance of the distributed data grid. The low contention queue is also useful in a wide variety of other multithreaded messaging systems and multithreaded processing environments.

Accordingly, described herein are systems and methods that can support a low contention queue. The low contention queue is designed to provide a concurrent lock-free queue which reduces memory contention and also reduces the number of expensive compare-and-set (CAS) operations. The low contention queue described herein includes a doubly linked list of nodes, wherein each node is associated with a value, a reference to a next node and a reference to a previous node in the queue. Furthermore, the low contention queue allows one or more consumers to access the queue via a reference to a last removed node from the doubly linked list, and allows one or more producers to insert a new node via a tail reference to a last node in the doubly linked list. The low contention queue is optimized for concurrent use by large number of threads. Contention between the multiple threads performing operations on the low contention queue is reduced, thereby improving throughput of the queue such that the low contention queue can efficiently serve a large number of threads with reduced contention thereby improving performance in a distributed data grid.

These and other objects and advantages of the present invention will become apparent to those skilled in the art from the following description of the various embodiments, when read in light of the accompanying drawings.

DETAILED DESCRIPTION

Figure 1:
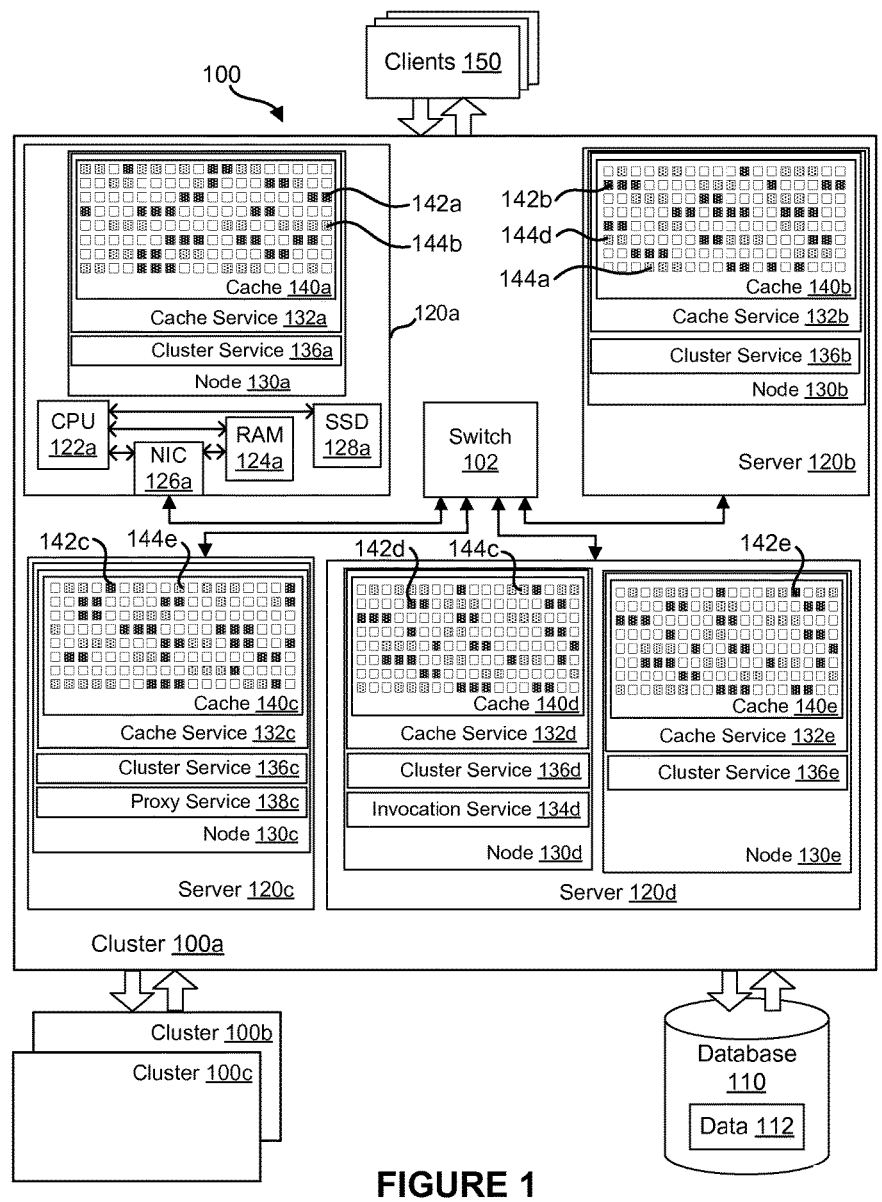
FIG. 1 illustrates a distributed data grid, in accordance with an embodiment of the invention.

Described herein are systems and methods that can support a low contention queue in a distributed data grid. In embodiments of the present invention, the distributed data grid described with respect to FIG. 1 is provided with improved performance by incorporating one or more low contention queue as described with respect to FIGS. 3A, 3B, 3C and 3D. The low contention queue is optimized to reduce memory contention and is lock-free. The low contention queue includes a doubly linked list of nodes, wherein each node is associated with a value, a reference to a next node and a reference to a previous node in the queue. Furthermore, the low contention queue allows one or more consumers to access the queue via a reference to a last removed node from the doubly linked list, and allows one or more producers to insert a new node via a tail reference to a last node in the doubly linked list. Contention between the multiple threads (producers and consumers) using the queue is thereby reduced. The low contention queue efficiently serves large number of threads with reduced contention thereby improving performance in the distributed data grid. The low contention queue is also useful in a wide variety of other multithreaded messaging systems and multithreaded processing environments.

In the following description, the invention will be illustrated, by way of example and not by way of limitation, in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. Functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Distributed Data Grid

A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability and information reliability. As a result of these capabilities, a distributed data grid is well suited for use in computational intensive, stateful middle-tier applications. In particular examples, distributed data grids, such as e.g., the Oracle® Coherence data grid, store information in-memory to achieve higher performance, and employ redundancy in keeping copies of that information synchronized across multiple servers, thus ensuring resiliency of the system and continued availability of the data in the event of failure of a server.

In the following description, an Oracle® Coherence data grid having a partitioned cache is described. However, one of ordinary skill in the art will understand that the present invention, described for example in the summary above, can be applied to any distributed data grid known in the art without departing from the scope of the invention. Moreover, although numerous specific details of an Oracle® Coherence distributed data grid are described to provide a thorough description of the invention, it will be apparent to those skilled in the art that the invention may be practiced in a distributed data grid without these specific details. Thus, a particular implementation of a distributed data grid embodying the present invention can, in some embodiments, exclude certain features, and/or include different, or modified features than those of the distributed data grid described below, without departing from the scope of the invention.

FIG. 1 illustrates and example of a distributed data grid 100 which stores data and provides data access to clients 150. A "data grid cluster", or "distributed data grid", is a system comprising a plurality of computer servers (e.g., 120a, 120b, 120c, and 120d) which work together in one or more cluster (e.g., 100a, 100b, 100c) to store and manage information and related operations, such as computations, within a distributed or clustered environment. While distributed data grid 100 is illustrated as comprising four servers 120a, 120b, 120c, 120d, with five data nodes 130a, 130b, 130c, 130d, and 130e in a cluster 100a, the distributed data grid 100 may comprise any number of clusters and any number of servers and/or nodes in each cluster. The distributed data grid can store the information in-memory to achieve higher performance, and employ redundancy in keeping copies of that information synchronized across multiple servers, thus ensuring resiliency of the system and continued availability of the data in the event of server failure. In an embodiment, the distributed data grid 100 implements the present invention, described for example in the summary above and the detailed description below.

As illustrated in FIG. 1, a distributed data grid provides data storage and management capabilities by distributing data over a number of servers (e.g., 120a, 120b, 120c, and 120d) working together. Each server of the data grid cluster may be a conventional computer system such as, for example, a "commodity x86" server hardware platform with one to two processor sockets and two to four CPU cores per processor socket. Each server (e.g., 120a, 120b, 120c, and 120d) is configured with one or more CPU, Network Interface Card (NIC), and memory including, for example, a minimum of 4 GB of RAM up to 64 GB of RAM or more. Server 120a is illustrated as having CPU 122a, Memory 124a and NIC 126a (these elements are also present but not shown in the other Servers 120b, 120c, 120d). Optionally each server may also be provided with flash memory—e.g. SSD 128a—to provide spillover storage capacity. When provided the SSD capacity is preferably ten times the size of the RAM. The servers (e.g., 120a, 120b, 120c, 120d) in a data grid cluster 100a are connected using high bandwidth NICs (e.g., PCI-X or PCIe) to a high-performance network switch 120 (for example, gigabit Ethernet or better).

A cluster 100a preferably contains a minimum of four physical servers to avoid the possibility of data loss during a failure, but a typical installation has many more servers Failover and failback are more efficient the more servers that are present in each cluster and the impact of a server failure on a cluster is lessened. To minimize communication time between servers, each data grid cluster is ideally confined to a single switch 102 which provides single hop communication between servers. A cluster may thus be limited by the number of ports on the switch 102. A typical cluster will therefore include between 4 and 96 physical servers.

In most Wide Area Network (WAN) configurations of a distributed data grid 100, each data center in the WAN has independent, but interconnected, data grid clusters (e.g., 100a, 100b, and 100c). A WAN may, for example, include many more clusters than shown in FIG. 1. Additionally, by using interconnected but independent clusters (e.g., 100a, 100b, 100c) and/or locating interconnected, but independent, clusters in data centers that are remote from one another, the distributed data grid can secure data and service to clients 150 against simultaneous loss of all servers in one cluster caused by a natural disaster, fire, flooding, extended power loss and the like. Clusters maintained throughout the enterprise and across geographies constitute an automatic 'backup store' and high availability service for enterprise data.

One or more nodes (e.g., 130a, 130b, 130c, 130d and 130e) operate on each server (e.g., 120a, 120b, 120c, 120d) of a cluster 100a. In a distributed data grid the nodes may be for example, software applications, virtual machines, or the like and the servers may comprise an operating system, hypervisor or the like (not shown) on which the node operates. In an Oracle® Coherence data grid, each node is Java virtual machine (JVM). A number of JVM/nodes may be provided on each server depending on the CPU processing power and memory available on the server. JVM/nodes may be added, started, stopped, and deleted as required by the distributed data grid. JVMs that run Oracle® Coherence automatically join and cluster when started. JVM/nodes that join a cluster are called cluster members or cluster nodes.

In an Oracle® Coherence data grid cluster members communicate using Tangosol Cluster Management Protocol (TCMP). TCMP is an IP-based protocol that is used to discover cluster members, manage the cluster, provision services, and transmit data between cluster members. The TCMP protocol provides fully reliable, in-order delivery of all messages. Since the underlying UDP/IP protocol does not provide for either reliable or in-order delivery, TCMP uses a queued, fully asynchronous ACK and NACK-based mechanism for reliable delivery of messages, with unique integral identity for guaranteed ordering of messages in queues associated with the JVMs operating on a server. The TCMP protocol requires only three UDP/IP sockets (one multicast, two unicast) and six threads per JVM/node, regardless of the cluster size.

The functionality of a data grid cluster is based on services provided by cluster nodes. Each service provided by a cluster node has a specific function. Each cluster node can participate in (be a member of) a number of cluster services, both in terms of providing and consuming the cluster services. Some cluster services are provided by all nodes in the cluster whereas other services are provided by only one or only some of the nodes in a cluster. Each service has a service name that uniquely identifies the service within the data grid cluster, and a service type, which defines what the service can do. There may be multiple named instances of each service type provided by nodes in the data grid cluster (other than the root cluster service). All services preferably provide failover and failback without any data loss.

Each service instance provided by a cluster node typically uses one service thread to provide the specific functionality of the service. For example, a distributed cache service provided by a node is provided by single service thread of the node. When the schema definition for the distributed cache is parsed in the JVM/node, a service thread is instantiated with the name specified in the schema. This service thread manages the data in the cache created using the schema definition. Some services optionally support a thread pool of worker threads that can be configured to provide the service thread with additional processing resources. The service thread cooperates with the worker threads in the thread pool to provide the specific functionality of the service.

In an Oracle® Coherence data grid, the cluster service (e.g., 136a, 136b, 136c, 136d, 136e) keeps track of the membership and services in the cluster. Each cluster node always has exactly one service of this type running. The cluster service is automatically started to enable a cluster node to join the cluster. The cluster service is responsible for the detection of other cluster nodes, for detecting the failure (death) of a cluster node, and for registering the availability of other services in the cluster. The proxy service (e.g., 138c) allows connections (e.g. using TCP) from clients that run outside the cluster. The invocation Service (e.g., 134d) allows application code to invoke agents to perform operations on any node in the cluster, or any group of nodes, or across the entire cluster. Although shown on only one node each, the invocation service and proxy service can be configured on any number up to all of the nodes of the distributed data grid.

In an Oracle® Coherence data grid, the distributed cache service (e.g., 132a, 132b, 132c, 132d, 132e) is the service which provides for data storage in the distributed data grid and is operative on all nodes of the cluster that read/write/store cache data, even if the node is storage disabled. The distributed cache service allows cluster nodes to distribute (partition) data across the cluster 100a so that each piece of data in the cache is managed primarily (held) by only one cluster node. The distributed cache service handles storage operation requests such as put, get, etc. The distributed cache service manages distributed caches (e.g., 140a, 140b, 140c, 140d, 140e) defined in a distributed schema definition and partitioned among the nodes of a cluster.

A partition is the basic unit of managed data in the distributed data grid and stored in the distributed caches (e.g., 140a, 140b, 140c, 140d, and 140e). The data is logically divided into primary partitions (e.g., 142a, 142b, 142c, 142d, and 142e), that are distributed across multiple cluster nodes such that exactly one node in the cluster is responsible for each piece of data in the cache. Each cache (e.g., 140a, 140b, 140c, 140d, and 140e) can hold a number of partitions. Each partition (e.g., 142a, 142b, 142c, 142d, 142e) may hold one datum or it may hold many. A partition can be migrated from the cache of one node to the cache of another node when necessary or desirable. For example, when nodes are added to the cluster, the partitions are migrated so that they are distributed among the available nodes including newly added nodes. In a non-replicated distributed data grid there is only one active copy of each partition (the primary partition). However, there is typically also one or more replica/backup copy of each partition (stored on a different server) which is used for failover. Because the data is spread out in partition distributed among the servers of the cluster, the responsibility for managing and providing access to the data is automatically load-balanced across the cluster.

The distributed cache service can be configured so that each piece of data is backed up by one or more other cluster nodes to support failover without any data loss. For example, as shown in FIG. 1, each partition is stored in a primary partition (e.g., dark shaded squares 142a, 142b, 142c, 142d, and 142e) and one or more synchronized backup copy of the partition (e.g., light shaded squares 144a, 144b, 144c, 144d, and 144e). The backup copy of each partition is stored on a separate server/node than the primary partition with which it is synchronized. Failover of a distributed cache service on a node involves promoting the backup copy of the partition to be the primary partition. When a server/node fails, all remaining cluster nodes determine what backup partitions they hold for primary partitions on failed node. The cluster nodes then promote the backup partitions to primary partitions on whatever cluster node they are held (new backup partitions are then created).

A distributed cache is a collection of data objects. Each data object/datum can be, for example, the equivalent of a row of a database table. Each datum is associated with a unique key which identifies the datum. Each partition (e.g., 142a, 142b, 142c, 142d, 142e) may hold one datum or it may hold many and the partitions are distributed among all the nodes of the cluster. In an Oracle® Coherence data grid each key and each datum is stored as a data object serialized in an efficient uncompressed binary encoding called Portable Object Format (POF).

In order to find a particular datum, each node has a map, for example a hash map, which maps keys to partitions. The map is known to all nodes in the cluster and is synchronized and updated across all nodes of the cluster. Each partition has a backing map which maps each key associated with the partition to the corresponding datum stored in the partition. An operation associated with a particular key/datum can be received from a client at any node in the distributed data grid. When the node receives the operation, the node can provide direct access to the value/object associated with the key, if the key is associated with a primary partition on the receiving node. If the key is not associated with a primary partition on the receiving node, the node can direct the operation directly to the node holding the primary partition associated with the key (in one hop). Thus, using the hash map and the partition maps, each node can provide direct or one-hop access to every datum corresponding to every key in the distributed cache.

In some applications, data in the distributed cache is initially populated from a database 110 comprising data 112. The data 112 in database 110 is serialized, partitioned and distributed among the nodes of the distributed data grid. Distributed data grid 100 stores data objects created from data 112 from database 110 in partitions in the memory of servers 120a, 120b, 120c, 120d such that clients 150 and/or applications in data grid 100 can access those data objects directly from memory. Reading from and writing to the data objects in the distributed data grid 100 is much faster and allows more simultaneous connections than could be achieved using the database 110 directly. In-memory replication of data and guaranteed data consistency make the distributed data grid suitable for managing transactions in memory until they are persisted to an external data source such as database 110 for archiving and reporting. If changes are made to the data objects in memory the changes are synchronized between primary and backup partitions and may subsequently be written back to database 110 using asynchronous writes (write behind) to avoid bottlenecks.

Although the data is spread out across cluster nodes, a client 150 can connect to any cluster node and retrieve any datum. This is called location transparency, which means that the developer does not have to code based on the topology of the cache. In some embodiments, a client might connect to a particular service e.g., a proxy service on a particular node. In other embodiments, a connection pool or load balancer may be used to direct a client to a particular node and ensure that client connections are distributed over some or all the data nodes. However connected, a receiving node in the distributed data grid receives tasks from a client 150, and each task is associated with a particular datum, and must therefore be handled by a particular node. Whichever node receives a task (e.g. a call directed to the cache service) for a particular datum identifies the partition in which the datum is stored and the node responsible for that partition, the receiving node, then directs the task to the node holding the requested partition for example by making a remote cache call. Since each piece of data is managed by only one cluster node, an access over the network is only a "single hop" operation. This type of access is extremely scalable, since it can use point-to-point communication and thus take optimal advantage of a switched fabric network such as InfiniBand.

Similarly, a cache update operation can use the same single-hop point-to-point approach with the data being sent both to the node with the primary partition and the node with the backup copy of the partition. Modifications to the cache are not considered complete until all backups have acknowledged receipt, which guarantees that data consistency is maintained, and that no data is lost if a cluster node were to unexpectedly fail during a write operation. The distributed cache service also allows certain cluster nodes to be configured to store data, and others to be configured to not store data.

In some embodiments, a distributed data grid is optionally configured with an elastic data feature which makes use of solid state devices (e.g. SSD 128a), most typically flash drives, to provide spillover capacity for a cache. Using the elastic data feature a cache is specified to use a backing map based on a RAM or DISK journal. Journals provide a mechanism for storing object state changes. Each datum/ value is recorded with reference to a specific key and in-memory trees are used to store a pointer to the datum (a tiny datum/value may be stored directly in the tree). This allows some values (data) to be stored in solid state devices (e.g. SSD 128a) while having the index/memory tree stored in memory (e.g. RAM 124a). The elastic data feature allows the distributed data grid to support larger amounts of data per node with little loss in performance compared to completely RAM-based solutions.

A distributed data grid such as the Oracle® Coherence data grid described above can improve system performance by solving data operation latency problems and by caching and processing data in real time. Applications cache data in the data grid, avoiding expensive requests to back-end data sources. The shared data cache provides a single, consistent view of cached data. Reading from the cache is faster than querying back-end data sources and scales naturally with the application tier. In memory performance alleviates bottlenecks and reduces data contention, improving application responsiveness. Parallel query and computation is supported to improve performance for data-based calculations. The distributed data grid is fault-tolerant, providing for data reliability, accuracy, consistency, high availability, and disaster recovery. The distributed data grid enables applications to scale linearly and dynamically for predictable cost and improved resource utilization. For many applications, a distributed data grid offers a valuable shared data source solution.

Queues in a Distributed Data Grid

As described above, a distributed data grid is a collection of computer servers which work together in one or more clusters to manage information and related operations, such as computations, within a distributed or clustered environment. Each computer server may include many virtual machine nodes, each node providing services to the cluster. Each service (e.g. Cache Service 132a of FIG. 1) on each node typically uses one service thread to provide the specific functionality of the service. The service threads communicate with other services and threads in the cluster or on the nodes as well as worker threads on the node.

A distributed data grid, as described above, is configured to process very large numbers of short tasks received from clients. For example, the service thread of a distributed cache service (e.g. cache service 132a of FIG. 1) is configured to process very large numbers of storage operation requests such as put, get, etc. received from applications or other nodes the network. The processing of each storage operation is short-lived, however, the number of storage operations is very large.

As described in the description of a distributed data grid above, services provided by a node of a distributed data grid typically use one service thread to provide the specific functionality of the service. Each service thread operates in a node configured on a server which, as described above, preferably comprises a multi-core processor. A multi-core processor is capable of processing many threads in parallel and/or simultaneously. Thus, in order to efficiently process the very large number of short-lived operations, a service thread such as the service thread for the distributed cache service (e.g. cache service 132a of FIG. 1) utilizes a pool of worker threads to provide the service thread with additional processing resources.

Communication between threads whether on the same node or different nodes may be mediated using queues. A queue is an abstract data type or collection in which the entities in the collection are kept in order and the principal operations on the collection are the addition of entities to the rear terminal position (tail), known as enqueue, and removal of entities from the front terminal position (head), known as dequeue. This makes the queue a first-in-first-out (FIFO) data structure in which the first element added to the queue will be the first one to be removed.

For example, in an environment where a service thread of the distributed data grid utilizes a pool of worker threads, when the worker threads are finished with tasks offloaded from the service thread they provide responses back to the service thread. There may be a large number of worker threads and a single service thread, thus communication between the worker threads and service thread can be achieved with a multiple producer single consumer queue. The worker threads are the multiple producers and the service thread is the single consumer. There are also many other processes in the distributed data where multiple threads/services send messages to a queue to be consumed by a single consumer thread/service.

However, where many threads use a queue concurrently, the queue becomes a source of contention and processing overhead. This is especially significant in a distributed data grid where a very large number of short-lived transactions are being processed by the worker threads. For example, a conventional queue requires multiple expensive compare-and-set (CAS) operations during insertion and removal of elements and can be subject to locking or problems caused by threads which are moved off the CPU before fully completing queue operations ("slow producers"). If the threads have to wait for the queue, they cannot work at performing additional tasks. Ultimately, the shared resource of the queue is so constrained that the worker threads can only proceed one at a time. This is a disadvantage because it negates the purpose of multiple threads—namely having multiple threads operating in parallel.

Disadvantages of a Conventional Queue

Figure 2:
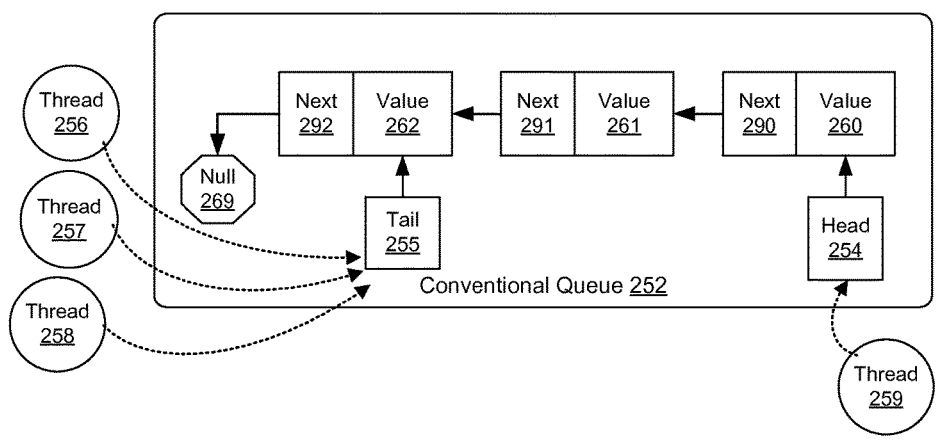
FIG. 2 illustrates a conventional queue.

FIG. 2 illustrates a conventional concurrent queue implementation. As shown in FIG. 2 the conventional queue 252 includes a linked list of nodes, each of which can have a value and a "next" reference that points to the next node in the linked list. For example, the first node can have a value 260 and a "next" reference 290 that points to the second node in the linked list. As shown in FIG. 2, the second node can have a value 261 and a "next" reference 291 that points to the third node in the linked list. The third node can have a value 262 and a "next" reference 292, which has a null value 269. Additionally, the conventional queue 252 can include a head reference 254, which points to the first node in the linked list, and a tail reference 255, which points to the last node in the linked list.

Threads 256, 257, and 258 (producers) operate in parallel and may attempt to access the conventional queue 252 concurrently to insert nodes into the conventional queue 252. As shown in FIG. 2, a thread (e.g. threads 256, 257, 258) attempting to insert a node into the conventional queue 252 will utilize a compare-and-set (CAS) operation on the "next" 292 having a null value 269 to insert a node into the queue. Essentially, the operation changes the "next" of the last node at the end of the queue such that it points to the newly inserted last node instead of a null value. The inserting thread also then changes the Tail reference 255 such that it points to the new last node instead of the previous last node. Insertion into the conventional queue thus includes CASing the tail reference 255—i.e. modifying the tail reference such that it points to the new tail after insertion. The inserting thread (producer) also has to perform additional logic to check that it is not inserting into an empty queue i.e. a queue that contains no nodes. Likewise a thread 259 (consumer), removing a node from the front of the queue is required to perform a CAS operation on the head 254 of the queue such that it references the next location following the node just removed in the operation.

Compare-and-set is an atomic instruction used in multithreading to achieve synchronization. It compares the contents of a memory location to a given value and, only if they are the same, modifies the contents of the memory location to a given new value. This is done as a single atomic operation. The atomicity guarantees that the new value is calculated based on up-to-date information; if the value had been updated by another thread in the meantime, the write would fail. Thus only one thread can CAS a memory location at a time. The result of the CAS operation indicates whether it performed the substitution with a simple Boolean response i.e. success or failure. The CAS operation is relatively expensive and is also required to obtain a lock on the memory location operated on during the operation.

Thus, operation of the conventional queue 252 utilizes a number of expensive CAS operations and can have issues related to memory contention. Performance of the conventional queue 252 can also be adversely impacted by "slow consumer" issues where updating the head or tail reference is delayed because the thread inserting or removing a node is moved off the CPU between the CAS on the node and the CAS on the head or tail reference. These issues can slow performance of the conventional queue 252 and increase the overhead associated with queuing and dequeuing nodes. As the number of threads competing to use a conventional queue 252 increases, the likelihood also increases that each thread's attempt to perform an operation will fail because another CAS operation performed by another thread is already in process locking the resource. This effectively increases the time it takes for a thread to successfully perform an operation, because the operation may fail one or more times before succeeding. When thread operations are performed at the maximum rate, adding new worker threads will not improve throughput of a system using the queue because the threads will just have to make more attempts to perform CAS operations before succeeding. Indeed, throughput may decrease because of the overhead of failed operations, and overhead related to idling and waking threads between failed attempts to perform operations.

Low Contention Queue

Thus, it is desirable to provide a low contention queue which overcomes the disadvantages of the conventional queue 252. Accordingly, described herein are systems and methods that can support a low contention queue. The low contention queue is designed to provide a low contention and lock-free queue which reduces memory contention during operations and also reduces the number of expensive compare-and-set (CAS) operations. The low contention queue described herein includes a doubly linked list of nodes, wherein each node is associated with a value, a reference to a next node in the queue, and a reference to a previous node in the queue. The doubly-linked list of nodes comprises an ordered plurality of nodes, the order of said nodes being specified by said next references and previous references of said nodes. Furthermore, the low contention queue allows one or more consumers to access the queue via a reference to a last removed node from the doubly linked list of nodes. Furthermore, the low contention queue allows one or more producers to insert a new node via a tail reference to a last node in the doubly linked list.

In an embodiment the present disclosure describes a system for supporting a concurrent queue in a distributed data grid, wherein the system comprises one or more microprocessors capable of multithreaded operation, memory, a queue running on the one or more microprocessors, wherein the queue includes a doubly linked list of nodes, wherein each node is associated with a value, a reference to a next node and a reference to a previous node in the queue, and wherein the queue allows one or more consumers to access the queue via a reference to a last removed node from the doubly linked list, and one or more producers to insert a new node via a reference to a last node in the doubly linked list. The queue is designed to be low contention and lock-free which reduces memory contention and also reduces the number of expensive compare-and-set (CAS) operations thereby improving performance in the distributed data grid by reducing queue processing overhead and latency and increasing queue maximum throughput.

The low contention queue is optimized for concurrent use by large number of threads. Contention between the multiple threads performing operations on the low contention queue is reduced, as is the overhead for each operation, thereby improving throughput of the queue such that the low contention queue can efficiently serve a large number of threads thereby improving performance in a distributed data grid. The low contention queue described below can be applied, for example, to enhance operation of a service thread configured with a pool of worker threads in a distributed data grid. The low contention queue can also be applied to a wide variety of other applications having multiple producers writing to a single queue.

Figure 3A:
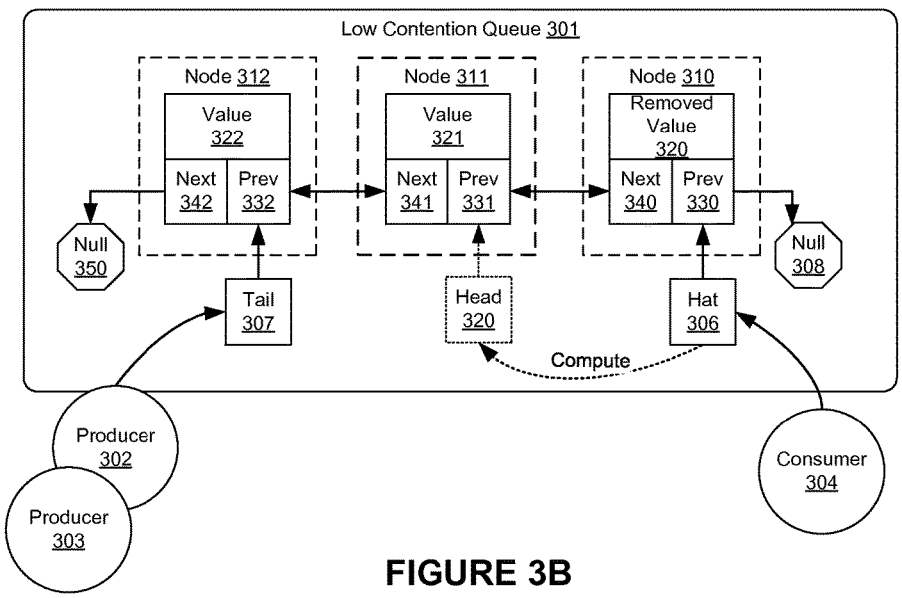
FIGS. 3A-3D illustrates systems and methods for implementing a low contention queue, in accordance with an embodiment of the invention.

FIG. 3A illustrates a system and method for supporting a low contention queue 301 in accordance with an embodiment of the invention. In accordance with an embodiment of the invention, the low contention queue 301 is optimized to reduce memory contention and is lock-free. A lock-free coalescing low contention queue when utilized in a distributed data grid such as an Oracle® Coherence distributed data grid (see distributed data grid 100 of FIG. 1), can improve the system performance when there are multiple threads using the queue concurrently. The low contention queue 301 can be applied, for example, to enhance operation of a service thread configured with a pool of worker threads in a distributed data grid. The low contention queue 301 can also be applied to a wide variety of other applications having multiple producers writing to a single queue.

As shown in FIG. 3A, a low contention queue 301 can be accessed concurrently by multiple producers and one or more consumers, e.g. the producers 302-303 and a consumer 304. In accordance with an embodiment of the invention, the concurrent queue 301 includes a doubly linked list of nodes, e.g. the nodes 310-112, each of which is associated with a value, a reference to a next node and a reference to a previous node in the queue. As shown in FIG. 3A, the low contention queue 301 further includes a last removed node 310, which is associated with a value 320, a "next" reference 340 to the first valid node 311 in the queue 301, and a "prev" reference 330 with a "null" value 308. Furthermore, the node 311 is associated with a value 321, a "next" reference 341 to a next node 312, and a "prev" reference 331 to a previous node 310. Also, the node 312 is associated with a value 322, a "next" reference 342 with a "null" value 350, and a "prev" reference 332 to a previous node 311.

As shown in FIG. 3A, a consumer 304 can access the queue 301 via the "hat" reference 306 to the last removed node 310. In such a case, the system can compute the head reference 320, which indicates the first valid node 311 in the queue 301, based on the "hat" reference 306. Thus, the consumer 304 can remove the first valid node 311 from the queue 301, and the system can update the "hat" reference 306 to point to the newly removed node 311. Also as shown in FIG. 3A, a producer 302 can insert a new node via a tail reference to a last node in the queue 301.

As shown in FIG. 3A, the structure of the body of the low contention queue 301 is a doubly-linked list of nodes. Each node includes a value and a "next" reference to the next node in the queue and a "previous" reference to the previous node in the queue. Each value is a piece of data and can be, for example, a message, a packet, an instruction, and/or a serialized data object. Each "next" reference is, for example, a memory address or relative memory address for the location of the next node in the queue (e.g. the adjacent node closer to the back/tail of the queue). Each "previous" reference is, for example, a memory address or relative memory address for the location of the previous node (e.g. the adjacent node closer to the front/hat of the queue). Although only three nodes are shown in FIG. 3A, low contention queue 310 may include fewer nodes or many more nodes at a particular time depending upon how many nodes have been added by producers and how many nodes have been removed by one or more consumer.

The queue itself references this list of nodes via two independent references. The "hat" reference 306 is used to provide information about the end of the list of where nodes are removed/consumed. The "hat" reference is, for example, a memory address or relative memory address for the location of the hat node (e.g. the node most recently removed). The "tail" reference 307 is used to provide information about the end of the list where nodes are inserted by producers. The "tail" reference is, for example, a memory address or relative memory address for the location of the tail node (e.g. the node most recently added). Note that the "hat" reference 306 to the front of the queue actually points to the last removed node rather than the "head" of the queue which contains the first valid node. Here the term "hat" is used as it is the thing that comes before the "head". Note that "head" is not an actual reference stored in memory. Instead, a consumer thread uses the "hat" reference and then computes the location of the first valid (not removed) node 311.

In comparison in the conventional queue 252 of FIG. 2, the "Head" reference 254, stored in memory, directly identifies the location of the first valid (not removed) value 260. For performance reasons it is critical that producers and consumers don't attempt to mutate the same references. In the conventional queue 252 of FIG. 2, when a producer thread 256, 257, 258 attempts to insert a node into the queue, the logic implemented by the producer thread has to account for the possibility that the queue is empty, i.e. that all values have already been removed from the queue by consumer thread 259. The producer thread must therefore include logic which checks whether the queue is empty, and, if the queue is empty, the producer thread must modify the head reference 254, as well as the tail reference 255 to point to the new value (the only value in the queue). This creates the possibility that the producer and the consumer may both try to modify/mutate the head reference 254 at the same time—a source of contention and reduced performance.

In the low contention queue of FIG. 3A, the use of the hat reference pointing to the most recently removed node allows insertions into the queue to not need to update (or even check) the hat reference. This is because even if the queue is empty (in that all values have been removed by consumers) the last removed node (e.g. node 310 with removed value 310) is left in place. Thus, the producer 302 does not need to change the hat reference. This has the advantage of reducing the complexity of the logic associated with insertion of a node by the producer thread and thus reduces processing overhead and latency. This also has the advantage of eliminating the possibility of contention between a consumer thread trying to modify the head reference at the same time as producer thread. In the low contention queue of FIG. 3A, consumer threads modify the hat reference 306 and producers never modify the hat reference 306. Thus, there is no contention between producers and consumers on the hat reference 306.

Additionally, when implementing the low contention queue of FIG. 3A, only the hat reference 306 and the tail reference 307 are volatiles, or more specifically AtomicReferences, while the next, prev, and value references of every node are all non-volatile references. Thus, in the low-contention queue, a compare-and set (CAS) operation is only required for modifying the hat reference 306 and the tail reference 307. A CAS operation is not required for the next, prev, and value references which are all normal non-volatile references which can be written to with a standard write/put. This is atypical (i.e. different than in the conventional queue 252 of FIG. 2), and requires careful implementation to ensure lock-free behavior as well as proper visibility of inserted nodes as will be described below.

As described above, a compare-and-set is an atomic instruction which compares the contents of a memory location to a given value and, only if they are the same, modifies the contents of that memory location to a given new value. This is done as a single atomic operation which guarantees that the new value is calculated based on up-to-date information; if the value had been updated by another thread in the meantime, the write would fail. Thus, only one thread can CAS a memory location at a time. The CAS operation is relatively expensive and is also required to obtain a lock on the memory location operated on during the operation. Thus, the low contention queue 301 of FIG. 3A, by being configured in a way that allows the next, prev, and value references to be non-volatile references, reduces the number of expensive CAS operations that must be performed, and reduces memory locking compared to the conventional queue 252 of FIG. 2.

In order to provide lock-free behavior in the low contention queue 301 of FIG. 3A, it is important to protect against a slow-producer. Each insertion of a node into the low contention queue 301 involves the producer 302 updating the tail (e.g. by CAS), and also updating the former tail's next reference (e.g. by write/put). These two steps cannot be performed atomically, that it is, it cannot be guaranteed that these two steps are performed together or not at all. If the producer (inserting thread) is swapped off the CPU between the two operations there is a possibility the transaction will only be half complete for a significant period of time until the inserting thread is swapped back onto the CPU to complete the second operation (updating the former tail's next reference). In order to reduce the performance impact in this "slow producer" situation, the low contention queue 301 is configured to ensure that other threads can still insert visible nodes into the queue without waiting for the "slow producer" to complete the second part of the insertion operation. The low contention queue 301 is also configured such that a consumer can remove (consume) a node which was half inserted by the slow producer without waiting for the "slow producer" to complete the second part of the insertion operation. This improves performance of the queue by decreasing and/or eliminating the impact of slow producers.

Figure 3B:
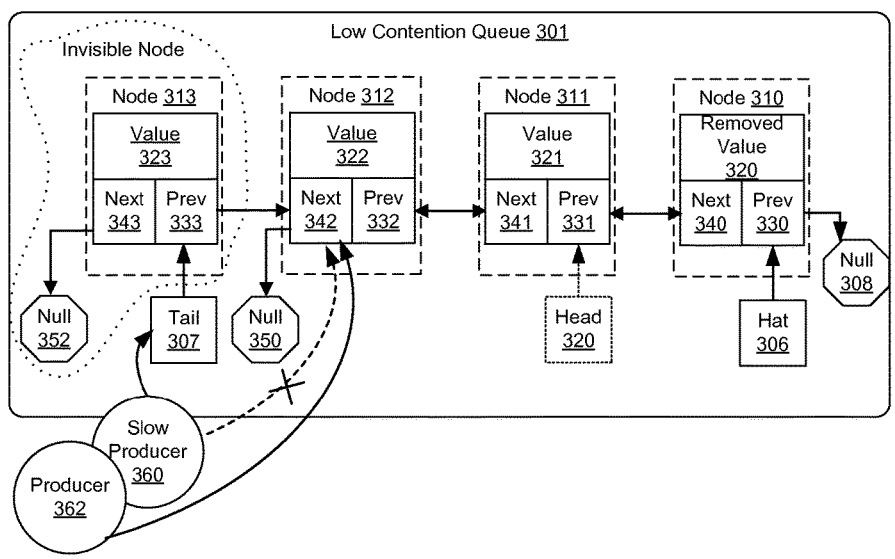

FIG. 3B illustrate low contention queue 301 in a "slow producer" scenario in which the node 313 has just been inserted into the queue by a producer thread 360. Node 313 has a value 323, a previous reference 333 which identifies node 312, and a next reference 343 that has a null value 352 (because there are no subsequent nodes). As shown in FIG. 3B, the producer thread 360 has successfully modified the tail reference 307 such that it points to the inserted node 313. However, the producer thread 360 has not yet updated the "next" reference 342 of node 312 to point to the node 313—accordingly the "next" reference 342 of node 312 still has null value 350. This would render node 313 effectively invisible to a consumer thread traversing the queue because the consumer thread would consider the null value 350 associated with "next" reference 342 to be the end of the queue. In a conventional queue, if the producer thread 360 is swapped off the CPU before updating the "next" reference 342 of node 312 (i.e. the thread 360 is a "slow producer"), the Node 313 (and all nodes subsequently inserted by other threads) could remain effectively invisible and unavailable to a consumer until the slow producer thread 360 is swapped back onto the CPU—which represents a significant delay and a cause of reduced performance. However, in low contention queue 301, the delay is prevented by allowing another producer thread 362 to complete the work of the slow producer thread 360 by modifying the "next" reference 342 of node 312 to point to the node 313.

For example insertion of a node into low contention queue 301 is performed using logic illustrated by the following pseudocode:

```
Node node = new Node(value);
Node tail;
do
   {
      node.prev = tail = f_tail.get( );
      Node behind = tail.prev;
      if (behind != null)
            behind.next = tail; // account for slow producer
   }
while (!f_tail.compareAndSet(tail, node));
tail.next = node;
```

As illustrated above, the logic of each producer thread assigns "behind" the value of the "next" reference of the former tail. If the thread finds the value of the "next" reference of the former tail is null, it writes the value of the "tail" reference into the "next" reference of the former tail so that it points to the new tail. The use of "behind" is the compensation logic. It ensures is that each time an attempt is made to insert a node, the producer first ensures that tail.prev.next=tail. That is the thread completes the work of the thread which inserted the tail in case that thread was swapped out just after the CAS on the tail reference. This correction is made before the new thread tries its own CAS on the tail reference which ensures that there is never an incomplete insertion except at the tail. If there are many threads concurrently trying to insert many may take the same corrective action on the same node, this is however safe to execute, without any form of locking as all threads are updating the field to the same value.

Looking at the example in FIG. 3B, slow producer 360 has completed a CAS on tail 307 to insert node 313 but has been swapped off the CPU before completing the update on "next" reference 342 of the former last node 312. Using the "behind" compensation logic another producer thread 362 which wishes to insert another node into the queue first examines the "next" reference 342 of the former last node 312—if it finds it to be null 350, the producer 362 sets the "next" reference 342 of the former last node 312 to be equal to the tail reference 307, before performing a CAS on the tail 307 to insert another node (not shown). Accordingly, producer thread 362 can update "next" reference 342 itself thereby rendering "visible" the node added by the slow producer and the node 313 added by producer thread 362. This avoids the situation where a node 313 added by a slow producer 260 (and all subsequent nodes) are effectively invisible until the slow producer 360 is swapped back on to the CPU after what could be an extended delay.

Figure 3C:
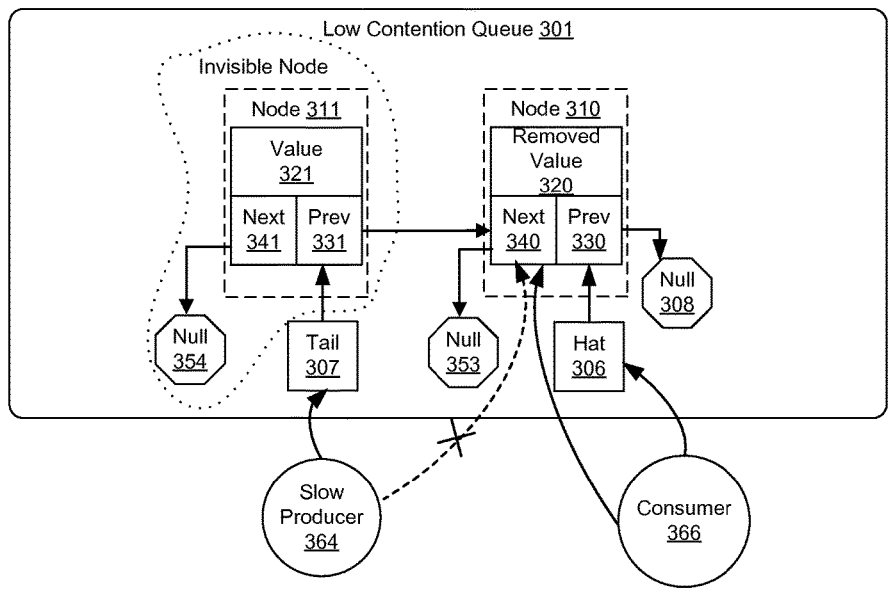

The implementation of low contention queue 301 also includes corrective logic in the node removal operation performed by a consumer thread in order to account for slow producers. As shown in FIG. 3C, low contention queue 301 now contains only a single node 311 which was inserted by a slow producer 364. Although low contention queue 301 has just a single node 311 with a value 321, it also, as previously described, has a "hat" in the form of node 310 with removed value 320. Slow producer 364 has performed a CAS on the tail 307 to insert the new node 311 but has been swapped off the CPU before updating the "next" reference 340 of the node 310 to point to the inserted node 311. As a consequence node 311 would effectively invisible based only on the "next" reference 340 which still has null value 353. Moreover, no other producer thread has attempted to insert another node and thereby fix the "next" reference of node 310 using the "behind" compensation logic described above with respect to FIG. 3B. Without any subsequent producers to correct the "next" reference 340 (set tail.prev.next to tail) the consumer must correct the slowness. That is the consumer thread needs a way to correct the "next" reference 340 such that it points at node 311 thereby allowing the value 321 of node 311 to be read/consumed by consumer 366.

Thus low contention queue 301 implements the following corrective logic in the consumer thread 366 in the situation shown in FIG. 3C. The corrective logic allows consumer thread 366 to dereference the tail 307. If consumer thread 366 determines that that tail.prev==hat, then the consumer thread can compute that hat.next is supposed to be tail, and thus can set the head=tail can continue with the removal operation. In reference to FIG. 3C, consumer thread 366 can use tail 307 to identify node 311 and determine that "prev" reference 331 points to node 310, i.e. the same node 310 that hat 306 points to (i.e. tail.prev==hat). Accordingly consumer thread 366 can determine that the "next" reference 340 of node 310 should in fact properly point to node 311, i.e. the same node 311 that tail 307 points to (i.e. hat.next should be tail). Thus, consumer thread 306 can properly identify the node 311 which would be otherwise invisible by computing "head" i.e. the location of node 311 from the "tail" reference 307 (head=tail). Having computed the location of node 311, the consumer thread 306 can reach the node 311 and read/consumer the value 321 without waiting for the slow producer thread 364 to be swapped back onto the CPU.

Figure 3D:
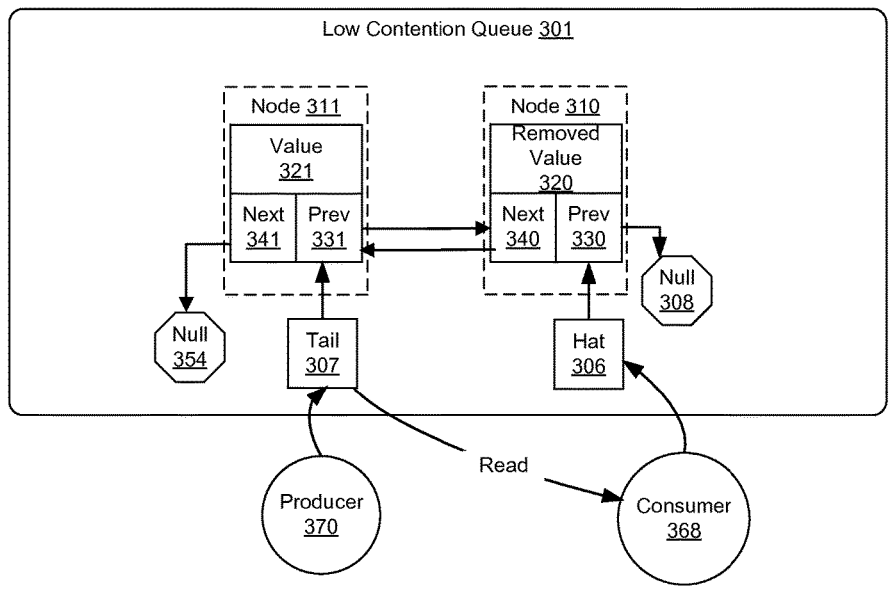

As shown in FIG. 3D, the second condition which the consumer thread 366 must account for is that, even if it does find the node 311 via the "next" reference 340 in the "hat" node next 310, it is possible that the consumer thread 368 doesn't have a clean view of the value 321 within that node 311. This is because the consumer 368 and the producer 370 don't actually share any memory barriers. That is, although the CAS operation performed by the producer 370 is atomic relative to the producer thread 370, there is still a small but finite possibility that the consumer thread 368 may try to read the value 321 while the CAS operation by the producer 370 is in progress. As described above, the value references are all non-volatile references, and thus value 321 is not locked during the CAS operation by the producer 370 on the tail reference 307. In order to ensure visibility of the removed value the consumer 368 invokes an otherwise unnecessary read of the tail reference 307. This read is sufficient to ensure that the consumer 368 has a clean view of the removed value at the time it was inserted into tail. That is to say, by reading the tail 307, consumer 368 can be sure that the CAS operation of tail 307 by producer 370 is actually complete and thus that the value 321 in node 311 can be trusted.

The removal method implemented by a consumer thread with respect to removing a node from the low contention queue 301 can be implemented with compensation logic represented in the following pseudocode.

```
Node hat;
Node head;
boolean dirty;
do
    {
    hat = f_hat.get( );
    head = hat.next;
    if (head == null)           // queue appears empty from hat
        {
        Node tail = f_tail.get( ); // get clean view from head to tail by reading tail reference
        if (tail == hat)
            return null;        // empty queue
        else if (tail.prev == hat)
            head = tail;        // set next reference of hat = tail to account for slow producer
        else
            head = hat.next;    // continue with clean view
        dirty = false;
        }
    else dirty = true;
    }
while (!f_hat.compareAndSet(hat, head));
head.prev = hat.next = null;
if (dirty) f_tail.get( ); // perform extra read of tail to ensure visibility of head value
return head.value.
```

Using the corrective logic described with respect to FIGS. 3B, 3C and 3D and in the pseudocode above, the low contention queue 301 as described herein requires only the hat reference 306 and the tail reference 307 are volatiles, or more specifically AtomicReferences which require CAS operations, while the next, prev, and value references are all non-volatile references. The low contention queue 301 thus provides lock-free queue which reduces memory contention and also reduces the number of expensive compare-and-set (CAS) operations thereby improving performance in the distributed data grid or other multithreaded messaging applications by reducing queue processing overhead, contention, and latency.

Figure 4:
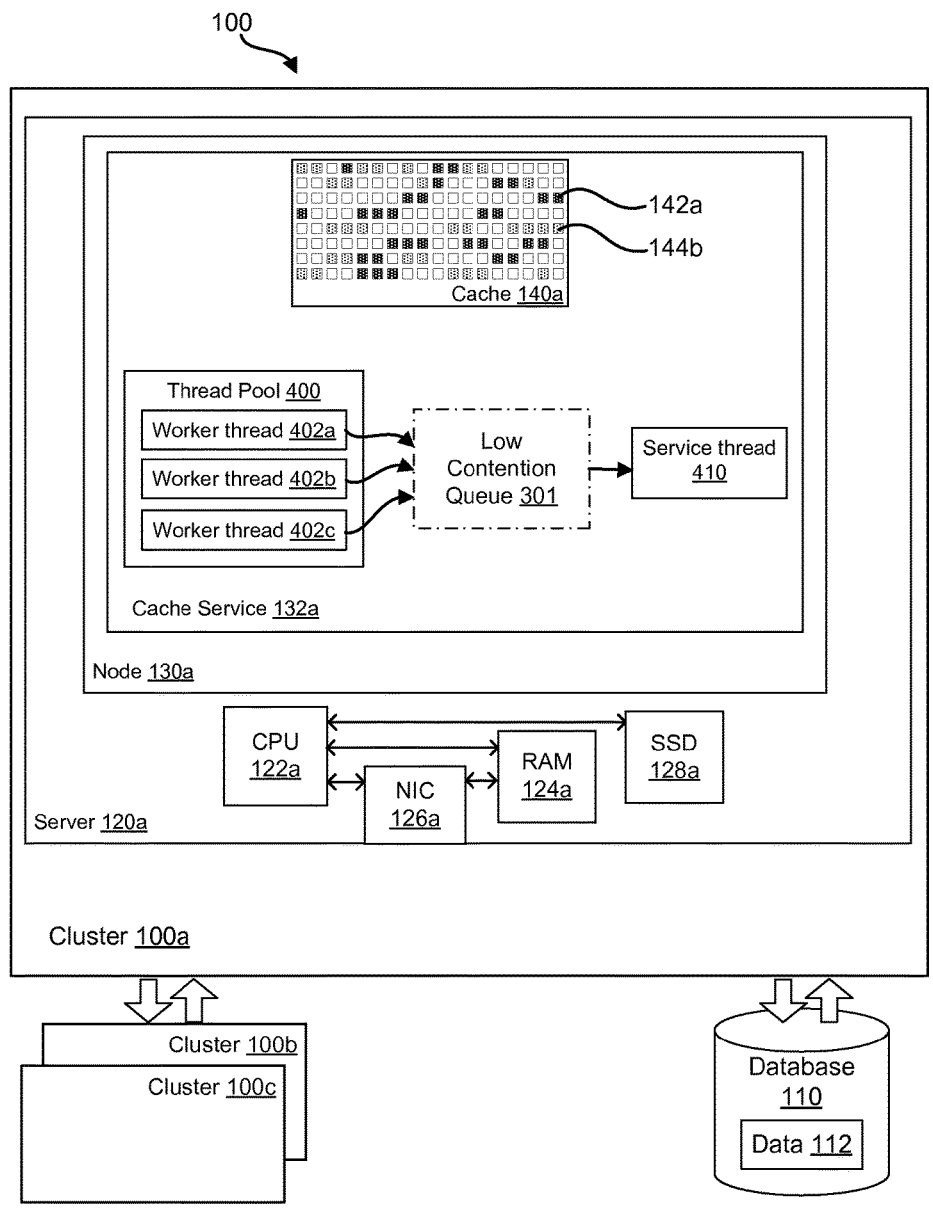
FIG. 4 illustrates implementation of a low contention queue in a distributed data grid, in accordance with an embodiment of the invention.

FIG. 4 illustrates implementation of a low contention queue in a distributed data grid, in accordance with an embodiment of the invention. As shown, for example, in FIG. 4, a service provided by a node 130a in a distributed data grid 100 can be provided by a service thread 410. The service may be, for example a cache service 132a. To provide extra processing resources, the service thread may work in cooperation with a thread pool 400 comprising a large number of worker threads (three shown) 402a, 402b, 402c. The worker threads can comprise multiple producers and the service thread comprises the single consumer for work performed by the worker threads. A low contention queue 301 as described above can be used by the large number of worker threads to communicate with the service thread. The low contention queue enhances operation of a service thread configured with the pool of worker threads in the distributed data grid by reducing contention between the worker threads as compared to use of a conventional queue. The low contention queue 301 can also be applied to a wide variety of other applications having multiple producers writing to a single queue in the distributed data grid 100 or other computing environments. For example, the low contention queue is also useful in other systems utilizing a multi-threaded messaging system.

Many features of the present invention can be performed in, using, or with the assistance of hardware, software, firmware, or combinations thereof. The present invention may be conveniently implemented using one or more conventional general purpose or specialized digital computer, computing device, machine, or microprocessor, including one or more processors, memory and/or computer readable storage media programmed according to the teachings of the present disclosure. Features of the invention may also be implemented in hardware using, for example, hardware components such as application specific integrated circuits (ASICs) and programmable logic device. Implementation of the hardware state machine so as to perform the functions described herein will be apparent to persons skilled in the relevant art.

Features of the present invention can be incorporated in software and/or firmware for controlling the hardware of a processing system, and for enabling a processing system to interact with other mechanisms utilizing the results of the present invention. Such software or firmware may include, but is not limited to, application code, device drivers, operating systems and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. The storage medium or computer readable medium can be non-transitory.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting a queue in a multithreaded processing environment, the method comprising:
providing a queue configured to hold an ordered plurality of nodes, wherein each node includes a value, a next reference and a previous reference;
maintaining in said queue a hat node, wherein the hat node represents a node of the ordered plurality of nodes having a most recently removed value, and wherein the hat node includes a hat.next reference;
maintaining in said queue, a hat reference which identifies a location of said hat node;
maintaining in said queue, a tail reference which identifies a location of a tail node wherein the tail node is the node of the ordered plurality of nodes which was most recently inserted into the queue;
configuring a consumer to access said queue by using the hat reference and the hat.next reference to locate a head node of said ordered plurality of nodes;
configuring a first producer of a plurality of producers to insert a new tail node into said ordered plurality of nodes held in said queue by modifying said tail reference such that it identifies said new tail node; and
configuring a second producer of said plurality of producers to identify a node previous to the new tail node using the tail reference that has been modified to identify the new tail node and the previous reference of the new tail node identified by the tail reference and ensure that a next reference of the node previous to the tail node identifies the same node as the tail reference prior to inserting a newer tail node into said ordered plurality of nodes held in said queue.

2. The method of claim 1, wherein each next reference, value, and previous reference of each node of said ordered plurality of nodes is non-volatile; and wherein said tail reference and said hat reference are atomic references.

3. The method of claim 2, further comprising:
configuring said consumer to use a compare-and-set operation on said hat reference when modifying said hat reference in connection with consuming a value of a node of the ordered plurality of nodes; and
configuring the first producer of said plurality of producers to use a compare-and-set operation on said tail reference when modifying said tail reference in connection with inserting the new tail node into said ordered plurality of nodes held in said queue.

4. The method of claim 1, further comprising:
configuring the first producer of said plurality of producers to insert said new tail node into said ordered plurality of nodes held in said queue using only a single compare-and-set operation.

5. The method of claim 1, further comprising:
configuring said consumer to remove a node from said ordered plurality of nodes held in said queue using only a single compare-and-set operation.

6. The method of claim 1, further comprising:
configuring said consumer such that, if the consumer determines that said hat.next reference is null, said consumer modifies said hat.next reference to be the same as said tail reference unless said tail reference is the same as said hat reference.

7. The method of claim 1, wherein said consumer is a consumer thread and said plurality of producers is a plurality of producer threads.

8. The method of claim 1, wherein the multithreaded processing environment is a distributed data grid, and wherein said consumer is a service thread associated with a service in said distributed data grid, and said plurality of producers is a plurality of worker threads in a thread pool associated with said service thread.

9. The method of claim 1, wherein said queue is a lock-free, low contention queue configured to be used by a large number of producers and said consumer concurrently.

10. A system for providing a queue in a multithreaded processing environment, the system comprising:
a computer system having a memory and microprocessor capable of multithreaded operation;
wherein said computer system is configured to,
provide a queue configured to hold in said memory an ordered plurality of nodes, wherein each node includes a value, a next reference and a previous reference;
maintain in said queue a hat node, wherein the hat node represents a node of the ordered plurality of nodes having a most recently removed value, and wherein the hat node includes a hat.next reference;
maintain in said queue, a hat reference which identifies a location of said hat node;
maintain in said queue, a tail reference which identifies a location of a tail node wherein the tail node is the node of the ordered plurality of nodes which was most recently inserted into the queue;
provide a consumer configured to access said queue by using the hat reference and the hat.next reference to locate a head node of said ordered plurality of nodes;
provide a first producer of a plurality of producers configured to insert a new tail node into said ordered plurality of nodes held in said queue by modifying said tail reference such that it identifies said new tail node; and
provide a second producer of said plurality of producers configured to identify a node previous to the new tail node using the tail reference that has been modified to identify the new tail node and the previous reference of the new tail node identified by the tail reference and ensure that a next reference of the node previous to the tail node identifies the same node as the tail reference prior to inserting a newer tail node into said ordered plurality of nodes held in said queue.

11. The system of claim 10, wherein each next reference, value, and previous reference of each node of said ordered plurality of nodes is non-volatile; and wherein said tail reference and said hat reference are volatile.

12. The system of claim 10, wherein:
said consumer is configured to use a compare-and-set operation on said hat reference when modifying said hat reference in connection with consuming a value of a node of the ordered plurality of nodes; and
the first producer of said plurality of producers is configured to use a compare-and-set operation on said tail reference when modifying said tail reference in connection with inserting the new tail node into said ordered plurality of nodes held in said queue.

13. The system of claim 10, wherein:
the first producer of said plurality of producers is configured to insert said new tail node into said ordered plurality of nodes held in said queue using only a single compare-and-set operation.

14. The system of claim 10, wherein:
said consumer is configured to remove a node from said ordered plurality of nodes held in said queue using only a single compare-and-set operation.

15. The system of claim 10, wherein:
said consumer is configured such that, if the consumer determines that said hat.next reference is null, said consumer modifies said hat.next reference to be the same as said tail reference unless said tail reference is the same as said hat reference.

16. The system of claim 10, wherein:
said consumer is a consumer thread and said plurality of producers is a plurality of producer threads, and wherein said plurality of producers threads are configured for concurrent operation on said microprocessor; and
wherein said queue is a lock-free, low contention queue configured to be used by a large number of producers and said consumer concurrently.

17. The system of claim 10, wherein:
the multithreaded processing environment is a distributed data grid;
the computer system is a computer server in said distributed data grid;
said consumer is a service thread associated with a service in said distributed data grid; and
said plurality of producers is a plurality of worker threads in a thread pool associated with said service thread.

18. A non-transitory computer readable medium including instruction stored thereon for supporting a queue in a multithreaded processing environment, which instructions, when executed, cause a multithreaded processing system to perform steps comprising:
providing a queue configured to hold an ordered plurality of nodes, wherein each node includes a value, a next reference and a previous reference;
maintaining in said queue a hat node, wherein the hat node represents a node of the ordered plurality of nodes having a most recently removed value, and wherein the hat node includes a hat.next reference;
maintaining in said queue, a hat reference which identifies a location of said hat node;
maintaining in said queue, a tail reference which identifies a location of a tail node wherein the tail node is the node of the ordered plurality of nodes which was most recently inserted into the queue;
configuring a consumer to access said queue by using the hat reference and the hat.next reference to locate a head node of said ordered plurality of nodes;
configuring a first producer of a plurality of producers to insert a new tail node into said ordered plurality of nodes held in said queue by modifying said tail reference such that it identifies said new tail node; and configuring a second producer of said plurality of producers to identify a node previous to the new tail node using the tail reference that has been modified to identify the new tail node and the previous reference of the new tail node identified by the tail reference and ensure that a next reference of the node previous to the tail node identifies the same node as the tail reference prior to inserting a newer tail node into said ordered plurality of nodes held in said queue.

\* \* \* \* \*

UNITED STATES PATENT AND TRADEMARK OFFICE
CERTIFICATE OF CORRECTION

PATENT NO. : 10,133,489 B2
APPLICATION NO. : 14/856114
DATED : November 20, 2018
INVENTOR(S) : Falco Page 1 of 1

It is certified that error appears in the above-identified patent and that said Letters Patent is hereby corrected as shown below:

In the Specification

In Column 15, Line 62, delete "that that" and insert -- that --, therefor.

Signed and Sealed this
Seventeenth Day of December, 2019

Andrei Iancu
*Director of the United States Patent and Trademark Office*